(12) United States Patent
Seo et al.

(10) Patent No.: US 11,094,273 B2
(45) Date of Patent: Aug. 17, 2021

(54) DISPLAY APPARATUS

(71) Applicant: SAMSUNG ELECTRONICS CO., LTD., Suwon-si (KR)

(72) Inventors: Young Kwang Seo, Suwon-si (KR); Atsuya Yokoi, Yokohama (JP); Hiromi Tachibana, Yokohama (JP); Eun Seok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/652,255

(22) PCT Filed: Sep. 28, 2018

(86) PCT No.: PCT/KR2018/011601
§ 371 (c)(1),
(2) Date: Mar. 30, 2020

(87) PCT Pub. No.: WO2019/066596
PCT Pub. Date: Apr. 4, 2019

(65) Prior Publication Data
US 2020/0243031 A1    Jul. 30, 2020

(30) Foreign Application Priority Data

Sep. 29, 2017   (KR) .......................... 10-2017-0127076

(51) Int. Cl.
  *G09G 3/36*    (2006.01)
  *G01H 11/06*   (2006.01)
  *G02F 1/1333*  (2006.01)
(52) U.S. Cl.
  CPC ........... *G09G 3/3648* (2013.01); *G01H 11/06* (2013.01); *G02F 1/1333* (2013.01); *G09G 2310/0264* (2013.01)

(58) Field of Classification Search
  CPC ... G01H 11/06; G02F 1/13312; G02F 1/1333; G02F 1/133314; G06F 1/1605;
  (Continued)

(56) References Cited

U.S. PATENT DOCUMENTS 6,130,858 A * 10/2000 Felesky ................... G01S 7/521
                                                      367/116
2010/0109481 A1   5/2010 Buccafusca
(Continued)

FOREIGN PATENT DOCUMENTS

CN        203224626     10/2013
GB          2531077      4/2016
(Continued)

OTHER PUBLICATIONS

International Search report dated Jan. 2, 2019, in corresponding International Patent Application No. PCT/KR2018/011601.
(Continued)

*Primary Examiner* — Tony O Davis
(74) *Attorney, Agent, or Firm* — Staas & Halsey LLP

(57) ABSTRACT

The present disclosure relates to a display apparatus including a display panel configured to display an image in a first direction, a sensor disposed in a direction opposite to the first direction with respect to the display panel and comprising a sensor head configured to transmit ultrasonic waves in a second direction or receive the ultrasonic waves in a direction opposite to the second direction, and a guide comprising a first opening into which the sensor head is inserted, a second opening opened in the second direction, a channel connecting the first opening and the second opening, and a guide portion provided inside the channel to guide the ultrasonic waves to change a traveling direction of the ultrasonic waves passing through the channel.

20 Claims, 16 Drawing Sheets

(58) Field of Classification Search
CPC .... G06F 1/3218; G06F 1/3231; G06F 1/3265; G09G 2310/0264; G09G 3/3648; H04N 21/44218; H04N 5/57; H04N 5/60; H04N 5/655
USPC ......................................................... 345/156
See application file for complete search history.

(56) References Cited

U.S. PATENT DOCUMENTS

| | | | |
|---|---|---|---|
| 2011/0260965 A1* | 10/2011 | Kim | G06F 3/017 345/156 |
| 2013/0214141 A1 | 8/2013 | Hogo et al. | |
| 2013/0329932 A1 | 12/2013 | Sudo et al. | |
| 2014/0247959 A1 | 9/2014 | Yamanaka et al. | |
| 2016/0191837 A1* | 6/2016 | Huh | G06F 1/1626 348/564 |
| 2016/0345113 A1* | 11/2016 | Lee | G01S 15/04 |
| 2018/0096682 A1* | 4/2018 | Cho | G10L 15/26 |
| 2019/0371333 A1* | 12/2019 | Kim | G06N 3/084 |

FOREIGN PATENT DOCUMENTS

| | | |
|---|---|---|
| JP | 2009-92937 | 4/2009 |
| JP | 4951711 | 6/2012 |
| JP | 2014-228777 | 12/2014 |
| KR | 10-2010-0130875 | 12/2010 |

OTHER PUBLICATIONS

Extended European Search Report dated Sep. 15, 2020 in European Patent Application No. 18862032.2.

* cited by examiner

DISPLAY APPARATUS

CROSS-REFERENCE TO RELATED APPLICATIONS

This application is a U.S. National Stage Application which claims the benefit under 35 U.S.C. § 371 of International Patent Application No. PCT/KR2018/011601 filed on Sep. 28, 2018, which claims foreign priority benefit under 35 U.S.C. § 119 of Korean Patent Application No. 10-2017-0127076 filed on Sep. 29, 2017 in the Korean Intellectual Property Office, the contents of both of which are incorporated herein by reference.

TECHNICAL FIELD

The present disclosure relates to a display apparatus, and more particularly, to a display apparatus including a motion sensor.

BACKGROUND ART

In general, a display apparatus is a device for displaying an image, such as a monitor or a television. A self-light emitting display panel, such as an organic light-emitting diode (OLED), or a light-receiving/emitting display panel, such as a liquid crystal display (LCD) panel, is used in a display apparatus.

The present disclosure relates to a display module and display apparatus to which a light-receiving/emitting display panel is applied. The display apparatus to which a light-receiving/emitting display panel is applied includes a display panel consisting of a liquid crystal panel and displaying an image, and a backlight unit supplying light to the display panel, and the backlight unit includes a light source module having a light source, and a plurality of optical sheets receiving light from the light source and guiding the light to the display panel.

As the aesthetic feeling of a display apparatus is emphasized recently, technologies for minimizing a bezel surrounding an edge of a display panel are increasing. Accordingly, the arrangement of a motion sensor provided to detect the motion of a person and control the operation of the display panel may become important.

DISCLOSURE

Technical Problem

The present disclosure is directed to providing a display apparatus with an improved structure so that a sensor is not exposed to the outside.

The present disclosure is directed to providing a display apparatus capable of improving sensing performance even when a sensor is not exposed to the outside.

Technical Solution

One aspect of the present disclosure provides a display apparatus including a display panel configured to display an image in a first direction, a sensor disposed in a direction opposite to the first direction with respect to the display panel and comprising a sensor head configured to transmit ultrasonic waves in a second direction or receive the ultrasonic waves in a direction opposite to the second direction, and a guide comprising a first opening into which the sensor head is inserted, a second opening opened in the second direction, a channel connecting the first opening and the second opening, and a guide portion provided inside the channel to guide the ultrasonic waves to change a traveling direction of the ultrasonic waves passing through the channel.

The guide portion may guide the ultrasonic waves to direct to the first direction when the ultrasonic waves transmitted from the sensor head pass through the second opening.

The guide portion may guide the ultrasonic waves such that the ultrasonic waves received to the sensor head directs to a direction opposite to the second direction after passing through the second opening.

The display apparatus may further include a top chassis disposed in the front of the display panel, wherein the guide and the sensor may be disposed at an inner side of the top chassis.

The display apparatus may further include a top chassis disposed in the front of the display panel, wherein the second opening of the guide may be disposed on the same line as an edge of the top chassis in the first direction.

The guide portion may be provided to be inclined in the first direction from the second direction.

The second opening may be disposed to be spaced apart in the second direction with respect to the first opening, the channel may include a first region adjacent to the first opening, a second region adjacent to the second opening, and a third region provided between the first region and the second region, and the guide portion may be disposed in the second region.

A cross-sectional area of the first region in the first direction may be wider than a cross-sectional area of the third region in the first direction.

A width of the first opening may be smaller than a width of the second opening.

A thickness of the second opening may be ½ or less of a thickness of the first opening.

When a wavelength of an ultrasonic wave transmitted from the sensor header is $\lambda$, a distance between an end portion of the sensor header and the second opening may be a value of an integer multiple of $\lambda/2$.

The sensor may further include a sensor substrate on which the sensor head is mounted, and the guide may further include a seating portion disposed on the first opening to allow the sensor substrate to be seated thereon.

The guide may further include a partition provided in the third region to partition an inner space of the third region into a plurality of spaces in a third direction.

The guide may further include a partition provided in the third region to partition an inner space of the third region into a plurality of spaces in the first direction.

The guide portion may be disposed in the second opening.

Another aspect of the present disclosure provides a display apparatus including a display panel configured to display an image on the front, a top chassis disposed in the front of the display panel, a sensor disposed in the rear of the display panel to transmit ultrasonic waves in the up-down direction or to receive the ultrasonic waves in the up-down direction, and a guide configured to guide a direction of the ultrasonic waves to change a traveling direction of the ultrasonic waves transmitted from the sensor and the traveling direction of the ultrasonic waves received to the sensor, wherein the sensor and the guide are disposed inside the top chassis.

The sensor may include a sensor head configured to transmit or receive the ultrasonic waves, the guide may include a first opening into which the sensor head is inserted, a second opening spaced apart in the up-down direction with respect to the first opening, a channel connecting the first opening and the second opening, and a guide portion provided inside the channel to guide the ultrasonic waves to change the traveling direction of the ultrasonic waves, and the second opening may be disposed on the same line as an edge of the top chassis in the front-rear direction.

The display apparatus may further include a bottom chassis coupled to the top chassis at the rear of the display panel and a rear cover covering the bottom chassis at the rear of the bottom chassis, wherein the sensor and the guide may be disposed between the bottom chassis and the rear cover.

The guide portion may be provided to be inclined forward such that the ultrasonic waves transmitted from the sensor head proceed forward.

Another aspect of the present disclosure provides a display apparatus including a display panel configured to display an image in a first direction, a sensor disposed in a direction opposite to the first direction with respect to the display panel and configured to transmit ultrasonic waves in a second direction or receive the ultrasonic waves in a direction opposite to the second direction, and a guide configured to guide the ultrasonic waves such that a traveling direction of the ultrasonic waves transmitted in the second direction is changed in the first direction or to guide the ultrasonic waves such that the ultrasonic waves is received to the sensor by changing the traveling direction of the ultrasonic waves proceeding in the direction opposite to the first direction to the direction opposite to the second direction.

Advantageous Effects

A display apparatus minimizing a bezel according to the present disclosure can lower the aesthetic feeling because a sensor is not exposed to the outside.

Further, the display apparatus according to the present disclosure can effectively maintain the performance of the sensor even when the sensor is placed inside the bezel by including a guide provided to easily sense the front of the display apparatus.

MODE OF THE INVENTION

Figure 1:
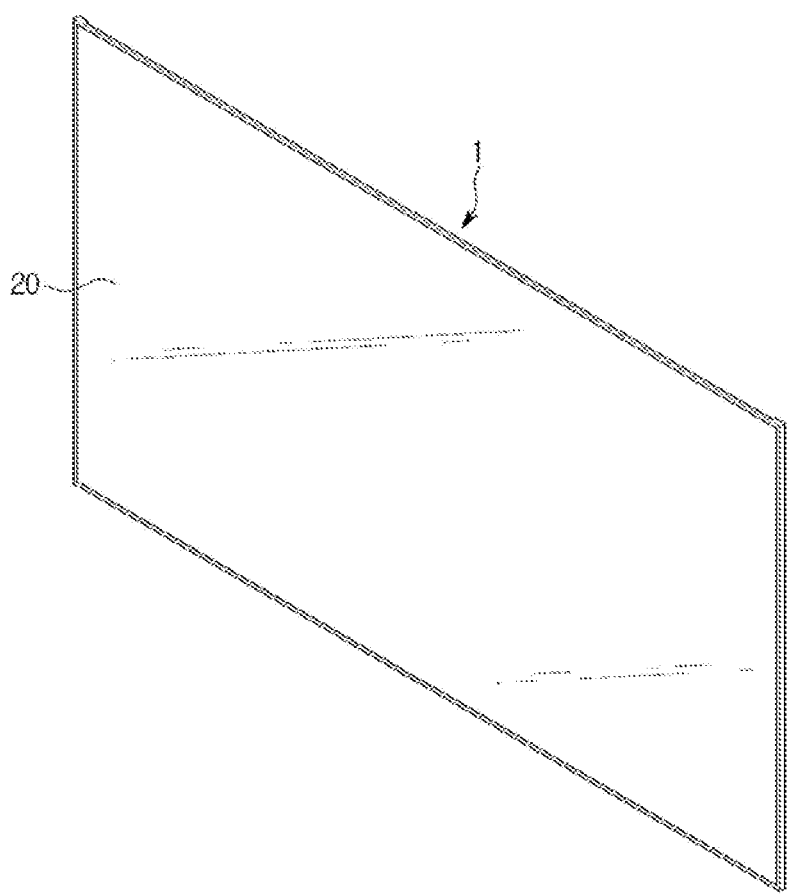
FIG. 1 is a perspective view of a display apparatus according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

Hereinafter, embodiments of the present disclosure will be described in detail with reference to the accompanying drawings.

Figure 2A:
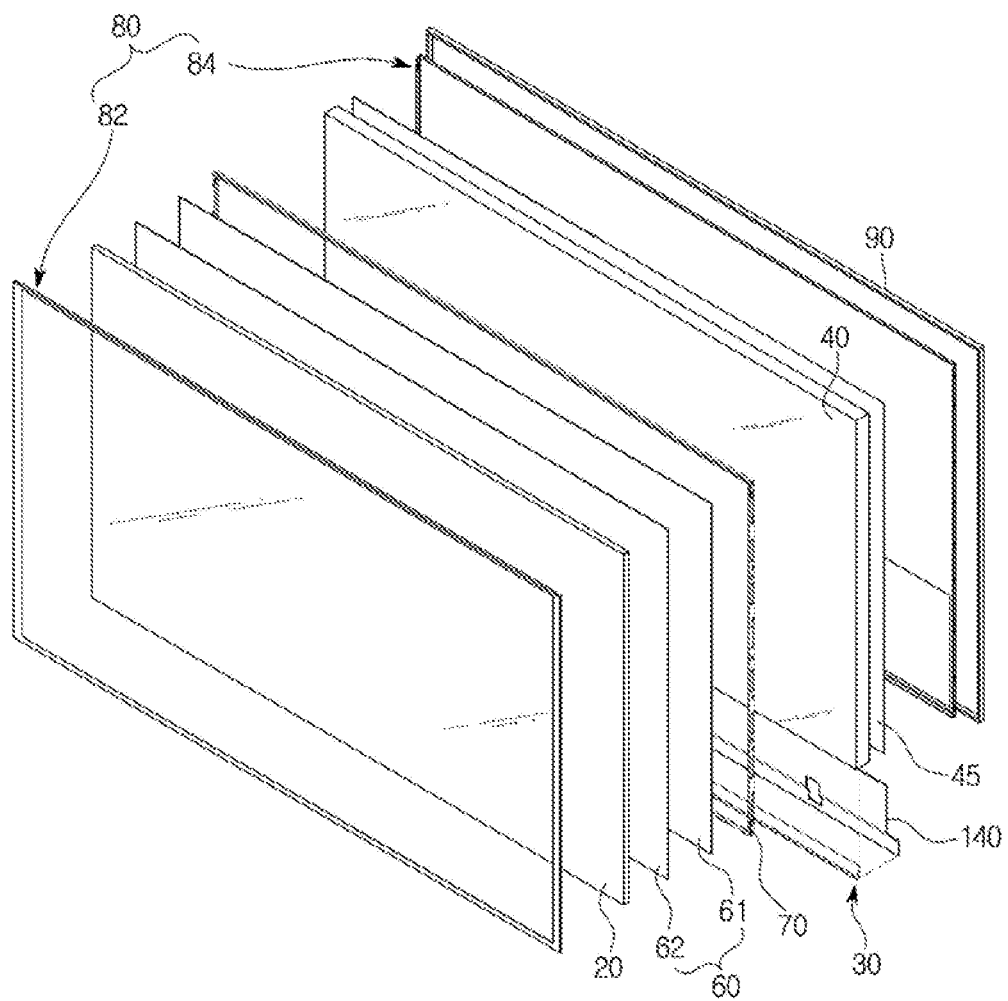
FIG. 2A is an exploded perspective view of components of the display apparatus according to an embodiment of the present disclosure.
Figure 2B:
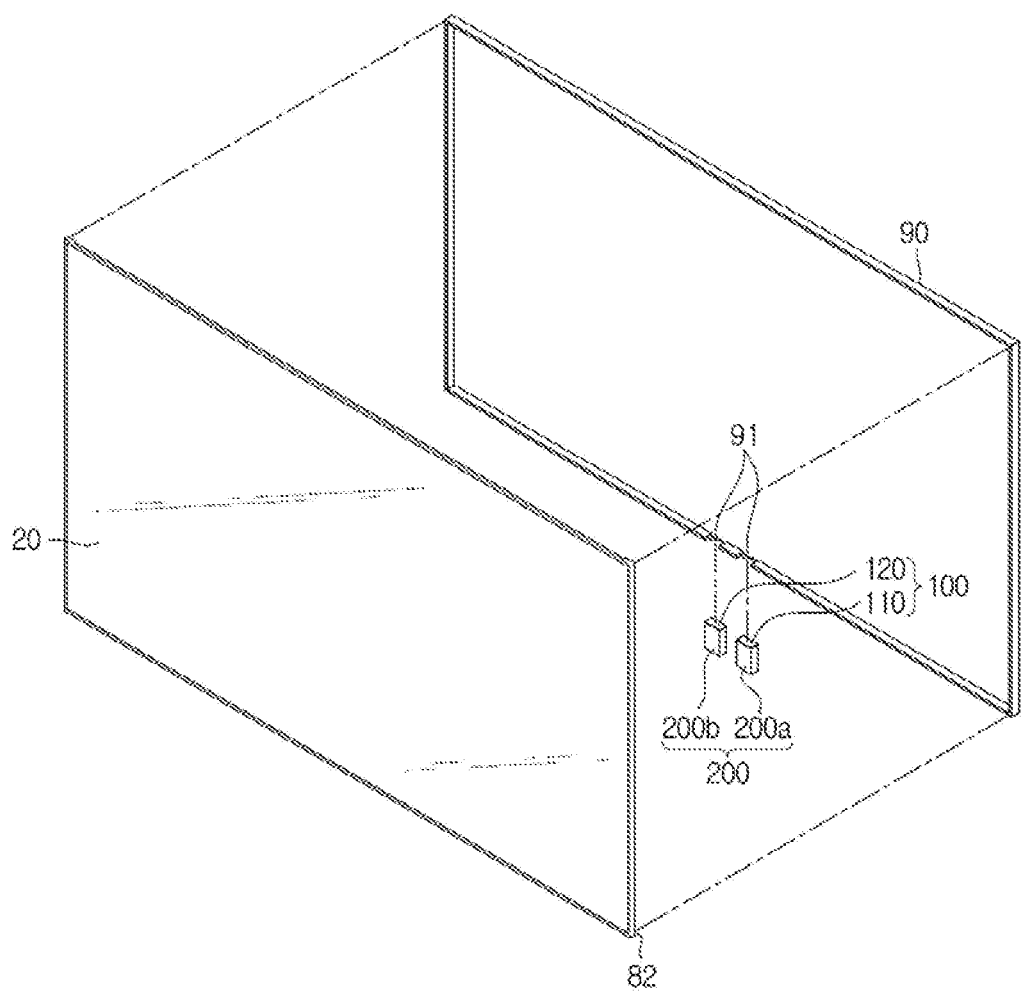
FIG. 2B is an exploded perspective view of a part of the components of the display apparatus according to an embodiment of the present disclosure.
Figure 3:
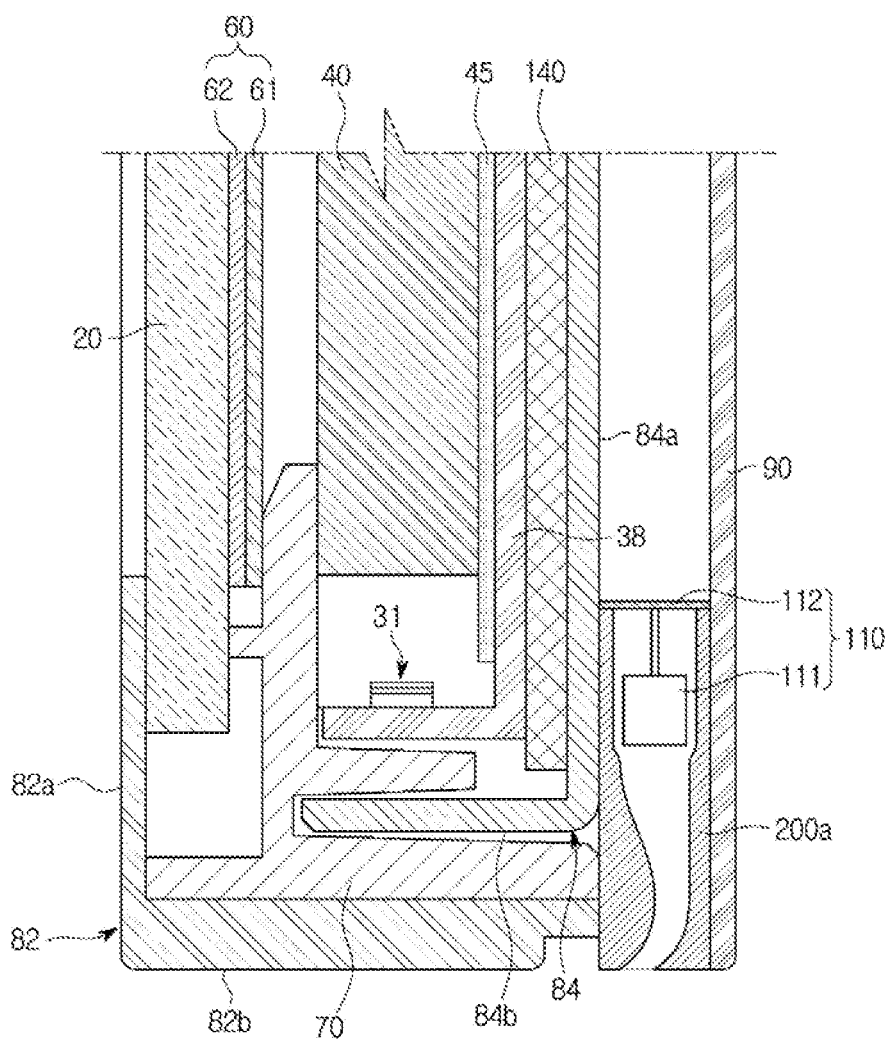
FIG. 3 is a cross-sectional view of a part of the components of the display apparatus according to an embodiment of the present disclosure.

FIG. 1 is a perspective view of a display apparatus according to an embodiment of the present disclosure, FIG. 2A is an exploded perspective view of components of the display apparatus according to an embodiment of the present disclosure, FIG. 2B is an exploded perspective view of a part of the components of the display apparatus according to an embodiment of the present disclosure, and FIG. 3 is a cross-sectional view of a part of the components of the display apparatus according to an embodiment of the present disclosure.

The present disclosure illustrates a flat display apparatus 1 as an example, but may be applied to a curved display apparatus or a bendable display apparatus.

The terms 'front' and 'front surface' used herein are based on a front surface of a display panel 20 side which displays an image, based on the display apparatus 1 illustrated in FIG. 1. Based on the above, the terms 'upper' and 'lower' indicate an upper side and a lower side of the display apparatus 1 illustrated in FIG. 1, and the terms 'opposite sides' and 'one side' indicate the left and right directions of the display apparatus 1 illustrated in FIG. 1.

The display apparatus 1 includes a display module for displaying an image.

The display module includes a display panel 20 on which an image is displayed, and a backlight unit configured to supply light to the display panel 20. The backlight unit may include a light source module 30 and an optical sheet 60. That is, the backlight unit may include the light source module 30 disposed in the rear of the display panel 20, a light guide plate 40 disposed in a space between the display panel 20 and the light source module 30 such that light transmitted from a rear side thereof is diffused and transmitted to the display panel 20 positioned at a front side thereof, an optical sheet 60 disposed between the light guide plate 40 and the display panel 20 to change optical properties, a middle mold 70 supporting the display panel 20 and the light guide plate 40, and a display chassis 80 forming an appearance. The display chassis 80 includes a top chassis 82 coupled to a front side of the middle mold 70 to maintain a state in which the display panel 20 is installed on the middle mold 70, and a bottom chassis 84 coupled to a rear side of the middle mold 70 and in which the light source module 30 is disposed on inner opposite sides thereof.

The light source module 30 may be disposed inside the bottom chassis 84 to irradiate light toward an inner center side of the bottom chassis 84. In the embodiment of the present disclosure, the light source module 30 is disposed at a lower portion of the display module, but is not limited thereto, and the light source module may be applied only to at least one side of the lower portion, sides, and an upper portion of the display module, or may be applied entirely along a circumference of the display module. A light source of an edge type display manner as above may be applied, or a light source of a direct type display manner may be applied.

The light guide plate 40, the display panel 20, and the top chassis 82 are sequentially installed on the front side of the middle mold 70, and the bottom chassis 84 is installed on the rear side of the middle mold 70, so that the respective components are not only supported by the middle mold 70, but also the display panel 20 and the bottom chassis 84 are maintained in a state of being spaced apart from each other.

The top chassis 82 includes a bezel portion 82a covering a front outer edge of the display panel 20, and a top side portion 82b bent backward from an end of the bezel portion 82a to cover a side surface of the middle mold 70.

The bottom chassis 84 includes a rear side portion 84a forming a rear surface of the display module, and a bottom side portion 84b extending forward from an edge of the rear side portion and coupled to the inside of the middle mold 70.

The light source module 30 may include a light source package 31 and a printed circuit board 38.

A light source of the light source package 31 includes a light emitting device (LED). A plurality of the light source packages 31 may be provided, and the plurality of light source packages 31 may be arranged to be spaced apart from each other at a predetermined interval. The plurality of light source packages 31 may be disposed on the printed circuit board to be spaced apart from each other.

The light guide plate 40 is disposed to be spaced apart from the bottom chassis 84 so that the light source module 30 is disposed on opposite sides of a space between the light guide plate 40 and an inner surface of the bottom chassis 84, that is, on the bottom side portion 84b side.

The light guide plate 40 may include a reflective member 45 on a rear surface thereof. The reflective member 45 may be provided on the rear surface of the light guide plate 40 so that all the light generated from the light source package 31 may direct to a front surface thereof. The reflective member 45, which is a reflective plate, may be provided separately from the light guide plate 40 and disposed on the rear surface of the light guide plate 40, or may be integrally formed with the light guide plate 40. In addition, by applying a reflective coating on the rear surface of the light guide plate 40, the same effects as described above may be obtained.

The light guide plate 40 is provided to transmit light generated from the light source. To this end, the light guide plate 40 may be formed of a transparent resin material. The light guide plate 40 may be disposed spaced apart from the light source to minimize deformation due to heat generated from the light source.

A rear cover 90 may be disposed in the rear of the bottom chassis 84 to cover the rear of the bottom chassis 84 and form an appearance of the display apparatus 1.

The bezel portion 82a of the top chassis 82 according to an embodiment of the present disclosure may be minimized in width to implement a so-called bezel-less display apparatus 1.

That is, the bezel portion 82a may be provided to minimize areas other than areas where anon-display area formed by a black matrix of the display panel 20 is not exposed to the outside. A lower end of the display panel 20 of the display apparatus 1 and a lower end of an edge of the bezel portion 82a may be formed to have a very short interval therebetween.

Accordingly, various sensors, which are typically disposed between a lower end of a display panel and a lower end of an edge of a bezel portion, may be difficult to be disposed between the lower end of the display panel 20 of the bezel-less display apparatus 1 and the lower end of the edge of the bezel portion 82a.

In particular, the display apparatus 1 according to an embodiment of the present disclosure may include a sensor 100 to detect whether a user exists in the front of the display apparatus 1.

The sensor 100 may detect whether a user exists in the front of the display apparatus 1 using ultrasonic waves. In detail, the sensor 100 may detect whether a user exists in the front of the display apparatus 1 by using an ultrasonic value measured when an ultrasonic wave transmitted by the sensor 100 is reflected by the user and the sensor 100 receives the reflected ultrasonic wave again.

As described above, in the display apparatus 1 according to an embodiment of the present disclosure, the sensor 100 may not be disposed between the lower end of the display panel 20 and the lower end of the edge of the bezel portion 82a. Therefore, the sensor 100 may be disposed at a rear side of the display panel 20.

In detail, the sensor 100 may be disposed between the bottom chassis 84 and the rear cover 90 so as not to be exposed to the outside. In a case where the sensor 100 is disposed below the display panel 20 similarly to a conventional display apparatus, the sensor 100 may be disposed outside the display panel 20 more than the bezel portion 82a, so that the sensor 100 may be exposed to the user, thereby lowering the aesthetic feeling of the entire display apparatus 1.

As the sensor 100 is disposed on the rear side of the display panel 20 without being exposed to the outside, problems may occur in transmitting ultrasonic waves forward and receiving ultrasonic waves returned from the front side. This is because even if the sensor 100 is disposed to transmit ultrasonic waves toward the front side, the front side is blocked by the display panel 20 so that the ultrasonic waves are difficult to be transmitted to the front side of the display apparatus 1 and the ultrasonic waves returned are also difficult to be received by the sensor 100 due to the display panel 20.

In order to solve this problem, the display apparatus 1 according to an embodiment of the present disclosure may include a guide 200 for guiding a traveling direction of ultrasonic waves so that the ultrasonic waves transmitted from the sensor 100 travel toward the front side and the ultrasonic waves reflected and returned are received by the sensor 100. The guide 200 will be described later in detail.

The sensor 100 may include a transmission sensor 110 to transmit ultrasonic waves and a reception sensor 120 to receive the transmitted and reflected ultrasonic waves. The transmission sensor 110 and the reception sensor 120 may be disposed between the rear cover 90 and the display panel 20 as described above. In detail, the transmission sensor 110 and the reception sensor 120 may be disposed in a space formed between the bottom chassis 84 and the rear cover 90.

The transmission sensor 110 may include a sensor head 111 to transmit ultrasonic waves and a sensor substrate 112 on which the sensor head 111 is mounted. The reception sensor 120 may include a sensor head 121 to receive ultrasonic waves and a sensor substrate (not shown) on which the sensor head 121 is mounted (see FIG. 7B).

The display apparatus 1 may include a first guide 200a to guide ultrasonic waves to change the traveling direction of the ultrasonic waves transmitted from the transmission sensor 110, and a second guide 200b to guide ultrasonic waves to change the traveling direction of the ultrasonic waves received from the reception sensor 120.

The first guide 200a and the second guide 200b may be disposed between the bottom chassis 84 and the rear cover 90 together with the sensor 100. The transmission sensor 110 and the reception sensor 120 may be disposed at one ends of the first guide 200a and the second guide 200b, respectively, and the other ends of the first guide 200a and the second guide 200b may be disposed in seating grooves 91 of the rear cover 90 which are opened downward, respectively. Through the seating grooves 91, ultrasonic waves transmitted from the transmission sensor 110 may be transmitted to the outside through the first guide 200a, and ultrasonic waves returned from the outside may be received by the reception sensor 120 through the second guide 200b. The other ends of the first guide 200a and the second guide 200b are portions in which a second opening 220 of the guide 200, which will be described later are formed, which will be described in detail later(see FIG. 7).

Accordingly, the sensor 100 and the guides 200a and 200b may be disposed at an inner side of the bezel portion 82a and may not be exposed to the user. In detail, the other ends of the guides 200a and 200b are disposed on the same line as an outer edge of the bezel portion 82a so that the guides 200a and 200b are not exposed to the outside and the sensor 100 disposed inside the guides 200a and 200b is also not exposed to the outside.

The sensor 100 and the guide 200 may be disposed at a lower portion of the display panel 20. However, the present disclosure is not limited thereto, and the sensor 100 and the guide 200 may be disposed at an upper portion or a side portion of the display panel 20. However, even when the sensor 100 is disposed at a portion other than the lower portion of the display panel 20, the sensor 100 may be disposed inward of the guide 200 with respect to the center of the display panel 20.

Unlike the sensor 100 according to an embodiment of the present disclosure, the transmission sensor 110 and the reception sensor 120 may be formed as one sensor. In this case, the sensor head may be provided to enable both transmission and reception of ultrasonic waves. In this case, the guide 200 may not include the plurality of first guides 200a and the second guides 200b and may be configured as one guide to guide ultrasonic waves transmitted and received by one of the sensor 100.

Hereinafter, the sensor 100 and the guide 200 of the display apparatus 1 will be described in detail.

Figure 4:
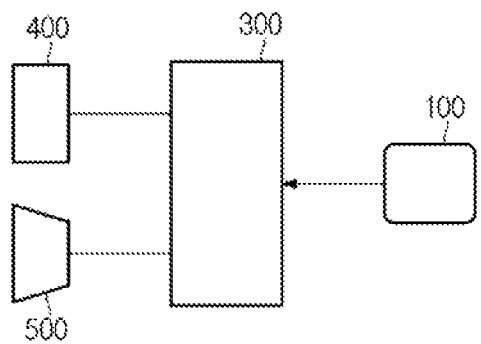
FIG. 4 is a schematic diagram of the operation of a controller and a part of the components of the display apparatus according to an embodiment of the present disclosure.
Figure 5:
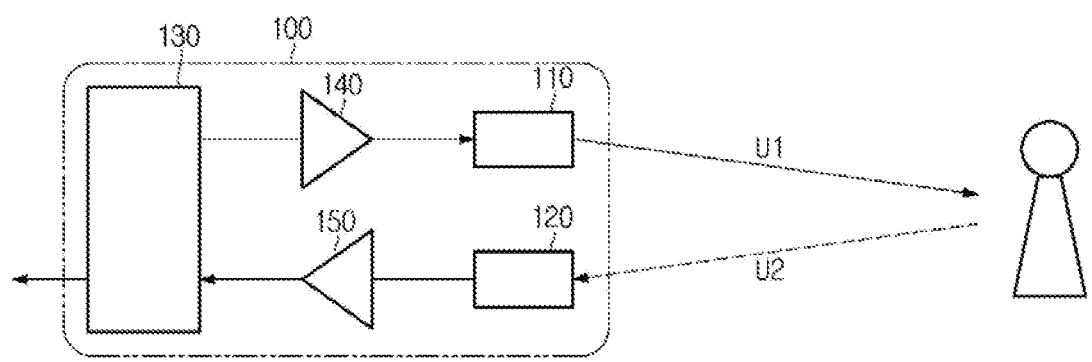
FIG. 5 is a schematic diagram of the operation of a sensor of the display apparatus according to an embodiment of the present disclosure.
Figure 6A:
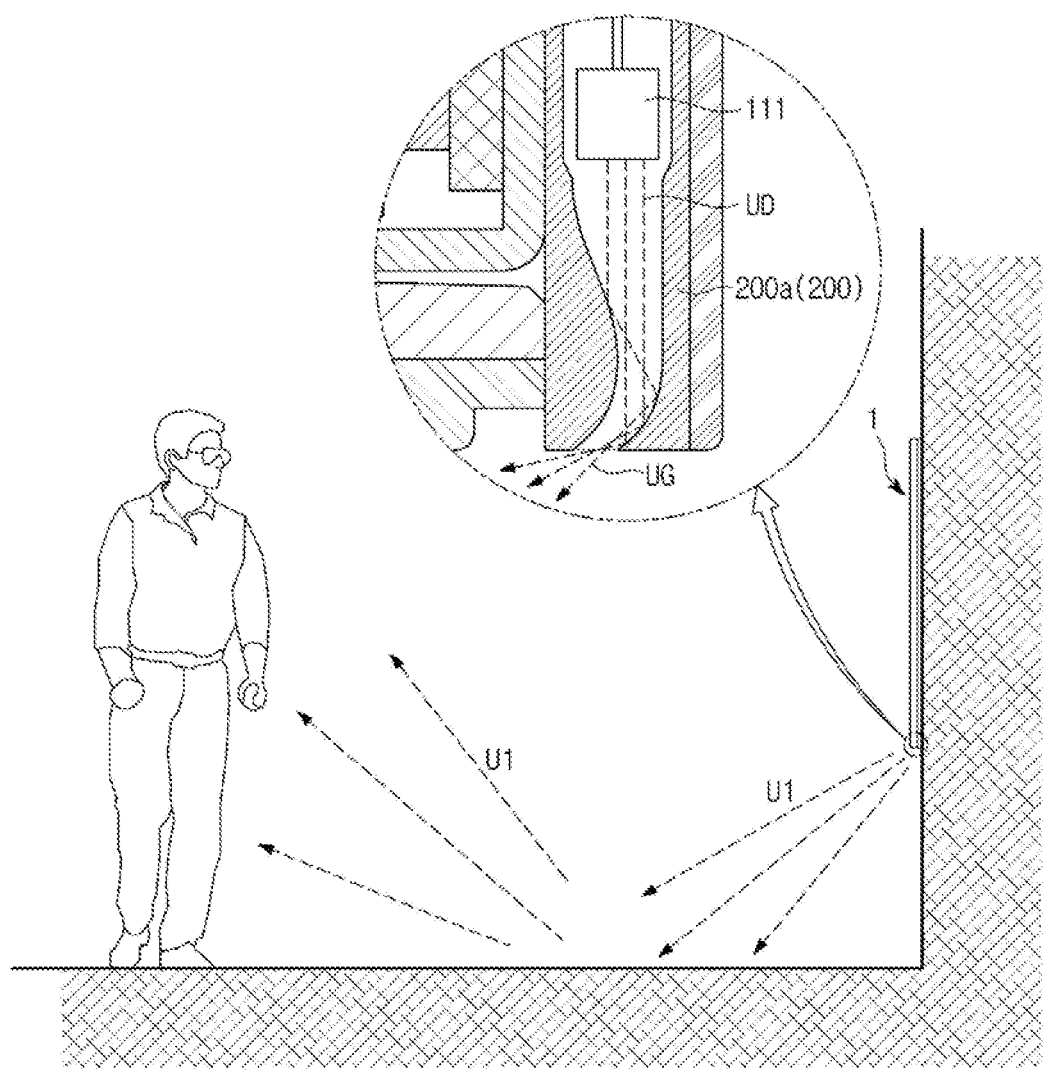
FIG. 6A schematically illustrates a state in which ultrasonic waves are transmitted from the sensor of the display apparatus according to an embodiment of the present disclosure.
Figure 6B:
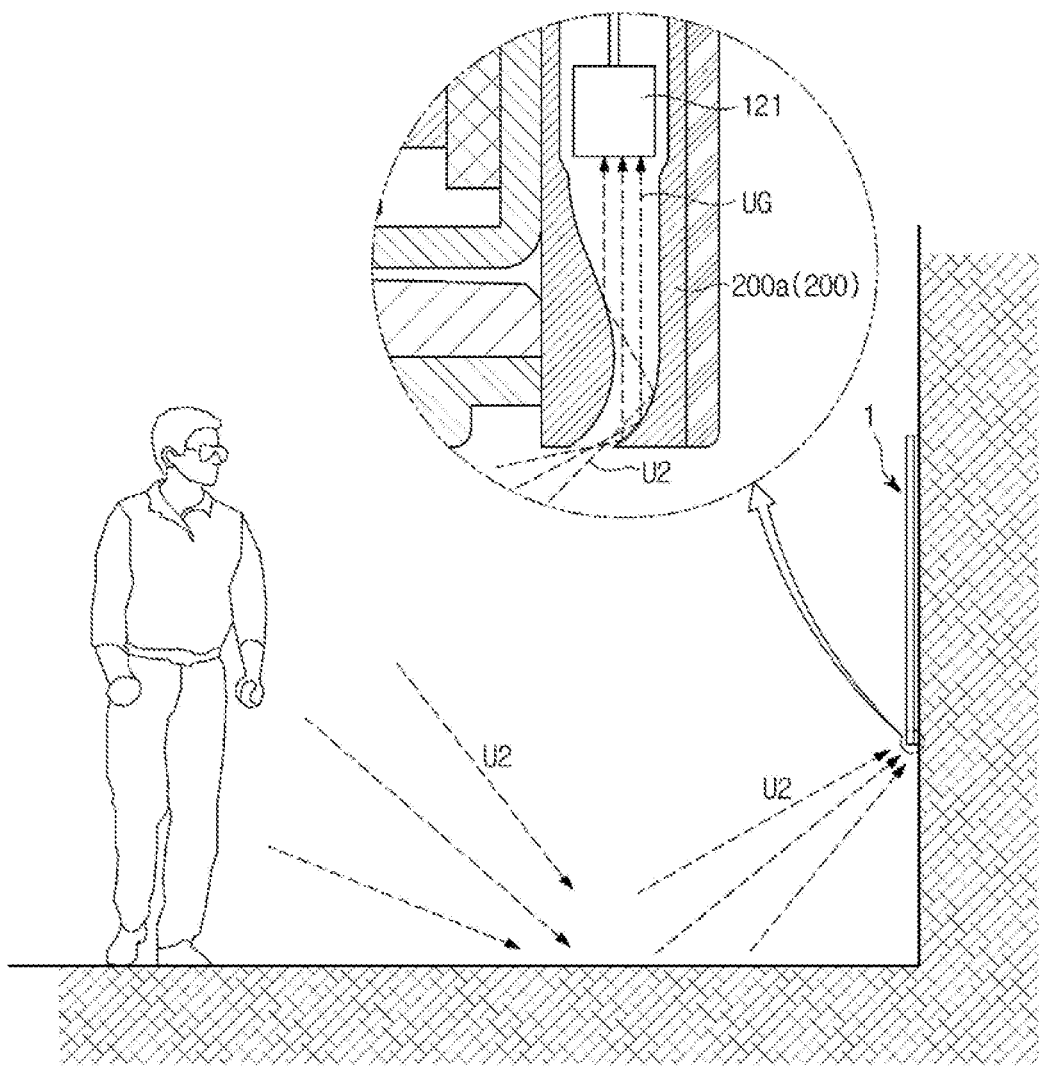
FIG. 6B schematically illustrates a state in which ultrasonic waves transmitted from the sensor of the display apparatus according to an embodiment of the present disclosure are reflected and received by the sensor again.

FIG. 4 is a schematic diagram of the operation of a controller and a part of the components of the display apparatus according to an embodiment of the present disclosure, FIG. 5 is a schematic diagram of the operation of a sensor of the display apparatus according to an embodiment of the present disclosure, FIG. 6A schematically illustrates a state in which ultrasonic waves are transmitted from the sensor of the display apparatus according to an embodiment of the present disclosure, and FIG. 6B schematically illustrates a state in which ultrasonic waves transmitted from the sensor of the display apparatus according to an embodiment of the present disclosure are reflected and received by the sensor again.

As described above, the sensor 100 may detect whether a user exists in the front of the display apparatus 1 to drive the display panel 20. In detail, as illustrated in FIG. 4, when the sensor 100 detects the presence of the user in the front of the display apparatus 1, the sensor 100 may transmit a signal to the controller 300, and the controller 300 may transmit a signal to a display controller 400 and an acoustic controller 500 to drive the display panel 20 and a speaker (not shown), respectively.

When the sensor 100 detects that the user does not exist in the front of the display apparatus 1, the sensor 100 may transmit a signal to the controller 300 again, and the controller 300 may transmit a signal to the display controller 400 and the acoustic controller 500 to stop driving of the display panel 20 and the speaker (not shown).

When the sensor 100 detects that the user does not exist in the front of the display apparatus 1, the sensor 100 may transmit a signal to the controller 300, and the controller 300 may transmit a signal to the display controller 400 such that the display controller 400 drives the display panel 20 to display a still image such as a photo on the display panel 20. In addition, when the sensor 100 detects that the user does not exist in the front of the display apparatus 1, the sensor 100 may transmit a signal to the controller 300, and the controller 300 may transmit a signal to the acoustic controller 500 such that the acoustic controller 500 drives the speaker to play music and the like.

The sensor 100 may transmit a signal for a distance value between the display apparatus 1 and the user to the controller 300, and the controller 300 may transmit a signal to the display controller 400 such that the display controller 400 adjusts the brightness of a display image on the display panel 20.

The sensor 100 may transmit a signal about a value for the movement of a user or a signal about a value for whether the user approaches the display apparatus 1 to the controller 300, and the controller 300 may transmit a signal to the display controller 400 such that various images are displayed on the display panel 20 according to the movement of the user.

As illustrated in FIG. 5, the sensor 100 may include a sensor controller 130 configured to drive the transmission sensor 110 and the reception sensor 120 and perform an algorithm by which the signal received through the reception sensor 120 is analyzed to calculate and determine whether the user exists in the front of the display apparatus 1, the movement of the user, whether the user approaches, a distance between the user and the display apparatus 1, and the like.

The display apparatus 1 may include a driver 140 configured to adjust the size of a signal and the like such that the signal transmitted from the sensor controller 130 matches the operating conditions of the transmission sensor 110, and an amplifier/filter 140 configured to amplify the signal received from the reception sensor 120 or to filter the signal and transmit the filtered signal to the sensor controller 130.

The transmission sensor 110 may receive an electrical signal and generate sound wave signals such as ultrasonic waves to emit ultrasonic waves into the air. According to an embodiment of the present disclosure, the transmission sensor 110 emits ultrasonic waves, but is not limited thereto, and may generate sound waves having various frequencies.

The reception sensor 120 may convert a sound wave signal such as an ultrasonic wave in the air into an electrical signal. Accordingly, the ultrasonic waves transmitted from the transmission sensor 110 are reflected and received by the reception sensor 120, and the received ultrasonic values are transmitted to the sensor controller 130 to calculate a value for the movement of the user or a value for whether the user exists.

As illustrated in FIG. 6A, the display apparatus 1 may include the first guide 200a to guide an ultrasonic wave to change the traveling direction of the ultrasonic wave such that an ultrasonic wave UD emitted downward directs to the front of the display apparatus 1.

The sensor head 111 may be disposed to direct to a lower side of the display panel 20. Accordingly, the sensor head 111 may emit ultrasonic waves toward the lower side of the display panel 20.

Unlike an embodiment of the present disclosure, the sensor head 111 may be disposed to be inclined with respect to the front, but in this case, a thickness of the rear cover 90 increases, which may hinder the slimming of the display apparatus 1 and thus lower the aesthetic feeling. In addition, the sensor head 111 may be disposed to direct to the front, but in this case, the sensor head 111 is provided at the outer side of the bezel portion 82a to emit ultrasonic waves to the front, which may also lower the aesthetic feeling of the display apparatus 1 (see FIG. 3).

The display apparatus 1 may include the first guide 200a to guide an ultrasonic wave to change the traveling direction of the ultrasonic wave such that an ultrasonic wave UD emitted downward directs to the front of the display apparatus 1.

The first guide 200a may be configured such that the traveling direction of the ultrasonic wave UD directing to the lower side directs to the front by guiding to change the traveling direction of the ultrasonic wave UD emitted downward from the sensor head 111. An ultrasonic wave UG guided by the first guide 200a and changed in direction may pass through the first guide 200a and directly direct to the user, or may be reflected by a reflective object (the floor or a component placed below the display apparatus 1) placed below the display apparatus 1 and then travel to the user side.

That is, a transmission ultrasonic wave U1 emitted from the display apparatus 1 is emitted downward by the sensor head 111 being formed downward, but the traveling direction may be set to direct to the user, which is present in front of the display apparatus 1, through the first guide 200a.

As illustrated in FIG. 6B, the display apparatus 1 may include the second guide 200b to guide a traveling direction of a return ultrasonic wave U2 such that the return ultrasonic wave U2 returned to the display apparatus 1 after the transmission ultrasonic wave U1 is reflected by the user directs to the reception sensor 120.

The sensor head 121 of the reception sensor 120 may be disposed to direct to the lower side like the sensor head 111 of the transmission sensor 110. Because the description thereof is the same as the description of the sensor head 111 of the transmission sensor 110, a description of overlapping content is omitted.

The second guide 200b may guide the return ultrasonic wave U2 such that the traveling direction of the return ultrasonic wave U2 is changed to a direction to which the sensor head 121 directs when the return ultrasonic wave U2 reflected by the user passes through the second guide 200b.

That is, when the transmission ultrasonic wave U1 traveling in the forward direction is reflected by the user and then the return ultrasonic wave U2 travels in the backward direction, the second guide 200b changes the traveling direction toward the rear side of the return ultrasonic wave U2 in the upward direction, so that the return ultrasonic wave U2 guided by the second guide 200b may travel in the upward direction and thus may be easily received by the sensor head 121 directing to the lower side.

Hereinafter, the guide 200 for guiding ultrasonic waves will be described in detail. Only the direction when the ultrasonic wave is transmitted and the direction when the ultrasonic wave is received are reversed and the guide principle and configuration of the first guide 200a and the second guide 200b are the same, and thus only the first guide 200a will be described, and redundant descriptions of the second guide 200b will be omitted. In addition, both the first guide 200a and the second guide 200b will be referred to as the guide 200 for convenience of description.

Figure 7:
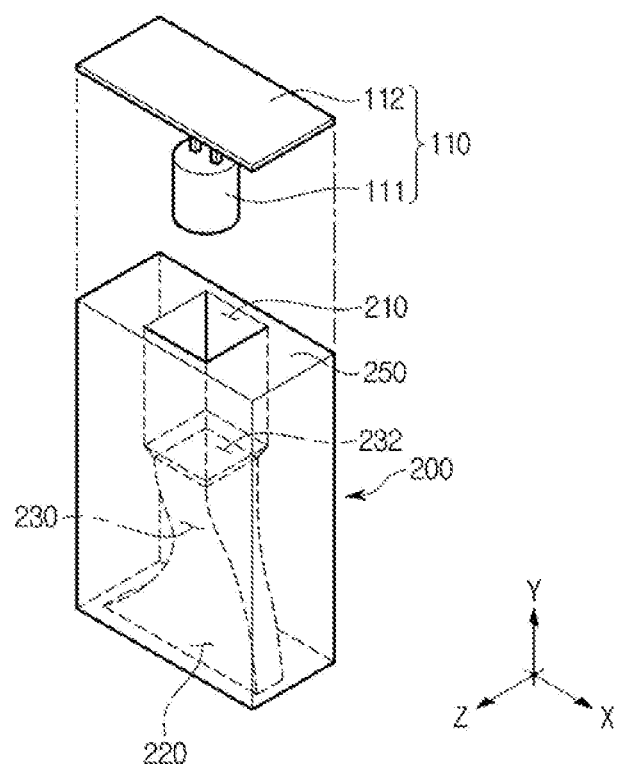
FIG. 7 is an exploded perspective view of the sensor and a guide of the display apparatus according to an embodiment of the present disclosure.
Figure 8A:
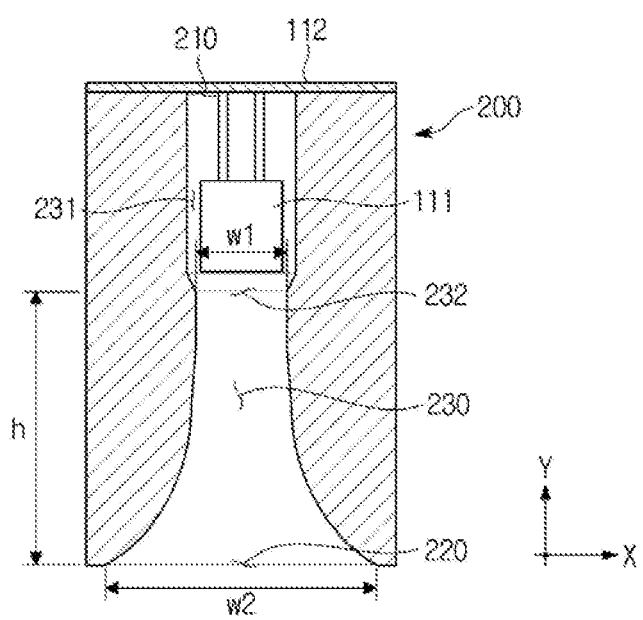
FIG. 8A is a cross-sectional view taken along an XY axis of the guide of the display apparatus according to an embodiment of the present disclosure.
Figure 8B:
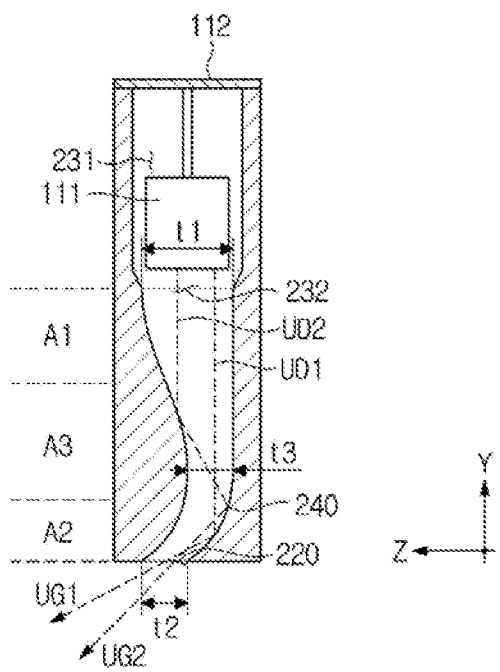
FIG. 8B is a cross-sectional view taken along an YZ axis of the guide of the display apparatus according to an embodiment of the present disclosure.

FIG. 7 is an exploded perspective view of the sensor and a guide of the display apparatus according to an embodiment of the present disclosure, FIG. 8A is a cross-sectional view taken along an XY axis of the guide of the display apparatus according to an embodiment of the present disclosure, and FIG. 8B is a cross-sectional view taken along an YZ axis of the guide of the display apparatus according to an embodiment of the present disclosure.

As illustrated in FIGS. 7 and 8A, the guide 200 may be disposed below the transmission sensor 110. A seating portion 250 on which the sensor substrate 112 of the transmission sensor 110 is seated may be disposed at an upper portion of the guide 200.

The sensor substrate 112 is seated on the seating portion 250 such that the transmission sensor 110 may be easily coupled to the guide 200. In a state in which the transmission sensor 110 is seated, the sensor substrate 112 may be coupled to the seating portion 250 by a bolt or the like. In addition, the sensor substrate 112 may be coupled to the seating portion 250 by an adhesive or the like.

The guide 200 may include a first opening 210 into which the sensor head 111 is inserted, a second opening 220 spaced downward from the first opening 210 and opened downward of the display apparatus 1, and a channel 230 through which the first opening 210 and the second opening 220 communicate.

The sensor head 111 is inserted into the channel 230 through the first opening 210, and ultrasonic waves emitted from the sensor head 111 may pass through the second opening 220 through the channel 230 to proceed toward the outside of the display apparatus 1.

The channel 230 may include a seating region 231 in which the sensor head 111 inserted through the first opening 210 is disposed. The sensor head 111 may be seated in the seating region 231 in a state where the transmission sensor 210 is seated by the seating portion 250.

Ultrasonic waves may pass between an end portion 232, which is formed on the opposite side of the first opening 210 in the seating region 231 and at which the ultrasonic waves start to be transmitted, and the second opening 220, and may proceed to the outside of the display apparatus 1.

The ultrasonic waves may resonate between the end portion 232 and the second opening 220 and travel to the outside. To this end, a distance h between the end portion 232 and the second opening 220 may be determined by a ratio of $(\lambda/2)*$(integer) for a wavelength $\lambda$ corresponding to a center frequency of an ultrasonic wave signal emitted from the sensor header 111.

When the left-right direction of the display apparatus 1 is an X axis, the up-down direction is a Y axis, and the front-rear direction is a Z axis, a width w1 of the end portion 232 with respect to the XY axis may be narrower than a width w2 of the second opening 222. That is, the channel 230 may be provided such that a width with respect to the XY axis is widened from the first opening 210 (exactly from the end portion 232) towards the second opening 220.

This is to widen the width of the channel 230 in a direction in which ultrasonic waves travels so that the ultrasonic waves may spread widely during traveling in the channel 230. Accordingly, when the ultrasonic waves pass through the second opening 220, the ultrasonic waves may proceed forward in a widely spread state.

The channel 230 may be provided such the width thereof becomes wide while forming a curved surface from the end 232 toward the second opening 220. Accordingly, the change in the traveling direction caused by the collision of the ultrasonic waves with an inner wall of the channel 230 may be minimized. However, the channel 230 is not limited to an embodiment of the present disclosure, but may be formed in an oblique shape in which the width thereof becomes wide toward the second opening 220.

As illustrated in FIG. 8B, a guide portion 240 may be provided in a space adjacent to the second opening 220 to guide the traveling direction of the downward ultrasonic waves to another direction.

The guide portion 240 may be inclined toward the front of the display apparatus 1. In detail, the guide portion 240 may form a section extending inclined forward from an upper side of the channel 230 toward a lower side of the channel 230 based on the YZ axis.

The guide portion 240 may be formed on an inner wall of a rear side of the channel 230 with respect to the YZ axis to guide ultrasonic waves to change the traveling direction of the ultrasonic waves from the rear side to a front side thereof.

That is, the ultrasonic waves emitted downward from the sensor head 111 may be reflected by the guide portion 240 so that the traveling direction thereof is changed to the front side and then may proceed toward the front side. An ultrasonic wave UD1 emitted downward from the sensor head 111 may be reflected forward by colliding with the guide portion 240 while moving downward and then direct to the front (UG1).

An ultrasonic wave UD2 emitted downward from the sensor head 111 collides with one side of the channel 230 while moving downward and proceeds downward in a traveling direction having an inclination with respect to the downward direction, and then may be reflected forward by colliding with the guide portion 240 and proceed toward the front (UG2).

Although the ultrasonic wave UD2 collides with one side of the channel 230 instead of the guide portion 240 so that the traveling direction thereof is changed, the ultrasonic wave UD2 may be guided by the guide portion 240 before passing through the second opening 220 to finally change the traveling direction thereof.

The guide portion 240 may extend toward the second opening 220 in a curved shape. Accordingly, the ultrasonic waves reflected from the guide portion 240 may naturally proceed toward the front along the shape in which the curved surface extends. Preferably, the ultrasonic waves may proceed to the front along the direction in which the curved surface extends in a form similar to the Coanda effect.

However, the guide portion 240 is not limited thereto and may extend toward the second opening 220 in an oblique form.

When the inner space of the channel 230 includes a first region A1 adjacent to the end portion 232 or the first opening 210, a second region A2 adjacent to the second opening 220, and a third region A3 formed between the first region A1 and the second region A2, the guide portion 240 may be disposed in the second region A2.

A thickness t1 of the first region A with respect to the YZ axis may be thicker than a thickness t3 of the third region A3 with respect to the YZ axis. In addition, a thickness t2 of the second opening 220 with respect to the YZ axis in the second region A2 may be equal to or less than ½ of the thickness t1 of the end portion 232 in the first region A1.

The thickness t1 of the end portion 232 or the first opening 110 may correspond to approximately a diameter of the sensor head 111. The reason why the thickness t2 of the second opening 220 is equal to or less than ½ of the thickness t1 of the end portion 232 is to prevent the ultrasonic waves emitted from the sensor head 111 from passing directly through the second opening 220 without colliding with the guide portion 240.

The ultrasonic waves passed directly through the second opening 220 without colliding with the guide portion 240 are ultrasonic waves proceeding downward and have no directivity toward the front, and thus may lower the efficiency of the sensor 110.

Hereinafter, a guide 200' of the display apparatus 1 according to another embodiment of the present disclosure will be described. Configurations other than the guide 200', which will be described below, are the same as those of the display apparatus 1 according to an embodiment of the present disclosure, and thus redundant descriptions thereof will be omitted.

Figure 9A:
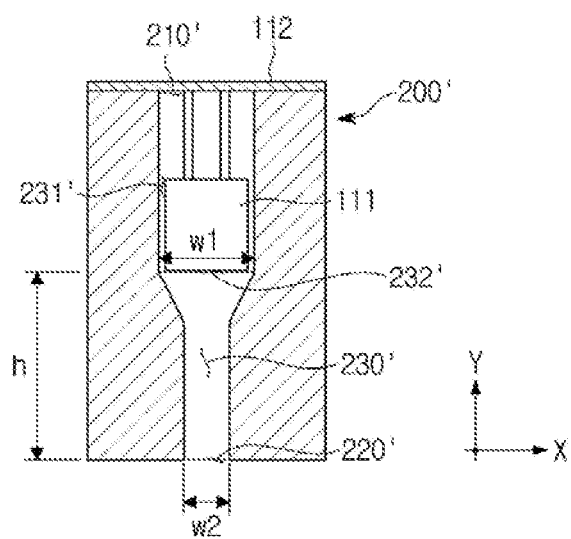
FIG. 9A is a cross-sectional view taken along an XY axis of a guide of a display apparatus according to another embodiment of the present disclosure.
Figure 9B:
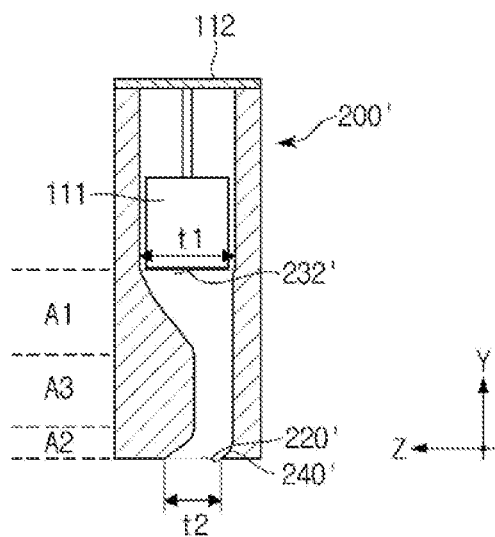
FIG. 9B is a cross-sectional view taken along an YZ axis of the guide of the display apparatus according to another embodiment of the present disclosure.

FIG. 9A is a cross-sectional view taken along an XY axis of a guide of a display apparatus according to another embodiment of the present disclosure, and FIG. 9B is a cross-sectional view taken along an YZ axis of the guide of the display apparatus according to another embodiment of the present disclosure.

As illustrated in FIGS. 9A and 9B, a channel 230' of the guide 200' according to another embodiment of the present disclosure may be formed such that the width c1 of an end portion 232' side in the direction from a first opening 210' to a second opening 220' with respect to the XY axis is equal to or greater than the width w2 of the second opening 222' side. That is, the channel 230' may be provided such that the width of the channel 230' remains the same or becomes narrow toward the second opening 220' (exactly from the end portion 232') from the first opening 210'.

This is opposite to the relative widths w1 and w2 of the end portion 232 of the channel 230 and the second opening 222 of the guide 200 according to an embodiment of the present disclosure described above, and is to prevent the cancellation effect between the ultrasonic wave signals that may occur when the ultrasonic waves proceed in a widely spread state while traveling inside the channel 230, by forming the channel 230' such that the width thereof becomes wide in a direction in which the ultrasonic waves travel, like the channel 230.

When the ultrasonic waves proceed while spreading due to the width of the channel 230, the intensity of the signals of the ultrasonic waves transmitted to the outside may be reduced by the cancellation action between the ultrasonic wave signals. To prevent this, the channel 230' of the guide 200' according to another embodiment of the present disclosure may be provided such that the width becomes narrow or remains the same from the first opening 210' toward the second opening 220', thereby preventing the ultrasonic waves from traveling outward while spreading in the width direction while the ultrasonic waves pass through the channel 230'.

The guide 200' may include a guide portion 240' to guide the traveling direction of the ultrasonic waves proceeding downward in a space adjacent to the second opening 220' to another side.

The guide portion 240' may be formed on an inner wall of a rear side of the channel 230' with respect to the YZ axis to guide the ultrasonic waves such that the traveling direction of the ultrasonic waves is changed to allow the ultrasonic waves to proceed from the rear side to the front side.

Unlike the inner wall of the rear side of the channel 230 including the curved surface according to an embodiment of the present disclosure described above, the rear inner wall of the channel 230' according to another embodiment of the present disclosure may be formed in a planar shape extending downward without including a curved surface.

The rear inner wall of the channel 230' may be formed to extend downward to the first region A1 and the third region A3 in a planar form and to be inclined forward by the guide portion 240' in the second region A2. The guide portion 240'may be formed to be inclined in the form of a curved surface toward the front by including a curved surface and may be disposed to be inclined in planar form in an oblique direction toward the front by including a flat surface.

The thickness t1 of the channel 230' with respect to the YZ axis of the first region A1 may become narrow while extending toward the third region A3. The thickness of the third region A3 with respect to the YZ axis may be provided to remain the same. The thickness t2 of the second region A2 with respect to the YZ axis may correspond to or be thicker than the thickness of the third region A3 with respect to the YZ axis.

Hereinafter, a guide 200" of the display apparatus 1 according to another embodiment of the present disclosure will be described. Configurations other than the guide 200", which will be described below, are the same as those of the display apparatus 1 according to an embodiment of the present disclosure, and thus redundant descriptions thereof will be omitted.

Figure 10A:
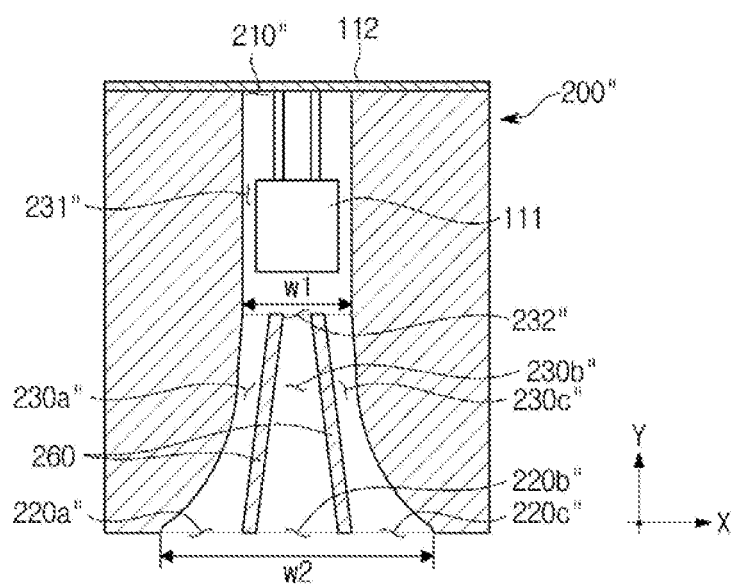
FIG. 10A is a cross-sectional view taken along an XY axis of a guide of a display apparatus according to another embodiment of the present disclosure.
Figure 10B:
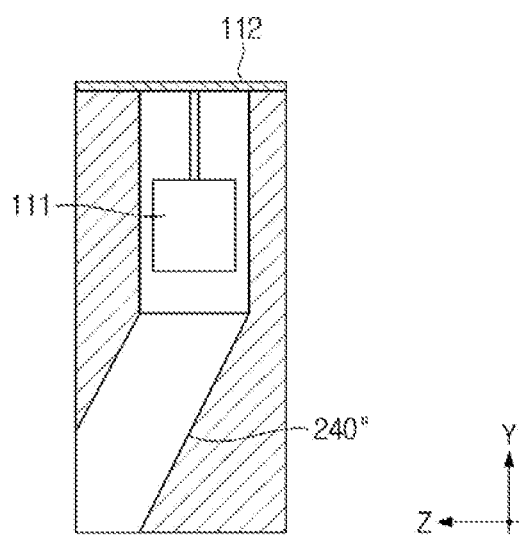
FIG. 10B is a cross-sectional view taken along an YZ axis of the guide of the display apparatus according to another embodiment of the present disclosure.

FIG. 10A is a cross-sectional view taken along an XY axis of a guide of a display apparatus according to another embodiment of the present disclosure, and FIG. 10B is a cross-sectional view taken along an YZ axis of the guide of the display apparatus according to another embodiment of the present disclosure.

As illustrated in FIGS. 10A and 10B, a channel 230" of the guide 200" according to another embodiment of the present disclosure is provided with a partition 260 to partition the inside of the channel 230" into a plurality of channels.

The partition 260 may partition the channel 230" into a plurality of channels in the direction of the XY axis. Accordingly, the channel 230" may be partitioned into a first channel 230$a$", a second channel 230$b$", and a third channel 230$c$". However, the present disclosure is not limited thereto, and the channel 230" may be partitioned into more or fewer numbers.

The ultrasonic waves passed through the respective channels 230$a$", 230$b$", and 230$c$" may travel to the outside by passing through a plurality of second openings 220$a$", 220$b$", and 220$c$".

The ultrasonic waves may pass through the channel 230" partitioned into the respective channels 230$a$", 230$b$", and 230$c$" by the partition 260. Through this, the cancellation effect that may occur between the ultrasonic wave signals while the ultrasonic waves pass through the channel 230" may be prevented.

In addition, by partitioning the channel 230", the transmission sensor 110 having one of the sensor head 111 may have similar efficiency as the transmission sensor having a plurality of sensor heads.

Because guides corresponding to a plurality of sensor heads need to be additionally provided when the plurality of sensor heads are provided, the costs for the plurality of sensor heads and the plurality of guides may increase, and when the plurality of sensor heads and the plurality of guides are disposed in the display apparatus, a space in which the sensors and the plurality of guides are disposed may increase.

However, the guide 200" of the display apparatus 1 according to another embodiment of the present disclosure in which the inside of the channel 230" is partitioned by a partition 260 may have an effect similar to that of a plurality of sensor heads phased-arrayed, by one sensor head 111.

The guide 200" may include a guide portion 240" disposed on a rear inner wall of the channel 230" based on the YZ axis.

The traveling direction of the ultrasonic waves passed through of the respective channels 230$a$", 230$b$", and 230$c$" may be changed to a front side by the guide portion 240". Accordingly, the ultrasonic waves passed through the plurality of second openings 220$a$", 220$b$", and 220$c$" may proceed forward the front.

The guide portion 240" according to another embodiment of the present disclosure is disposed to be inclined toward the front in a planar form, but may not be limited thereto and may be disposed to be inclined toward the front in a curved form.

Although not shown, the partition 260 may partition the channel 230" in the direction of the YZ axis. In this case, the partition 260 may be arranged in a plurality of plate shapes spaced apart in the direction of the YZ axis, the channel 230" may be partitioned in the front-rear direction of the display apparatus 1 through the partition 260, and the ultrasonic waves may proceed to the outside by passing through the channel 230" partitioned in the front-rear direction.

Hereinafter, the guide 200 of the display apparatus 1 according to another embodiment of the present disclosure will be described. Configurations other than the guide 200, which will be described below, are the same as those of the display apparatus 1 according to an embodiment of the present disclosure, and thus redundant descriptions thereof will be omitted.

Figure 11:
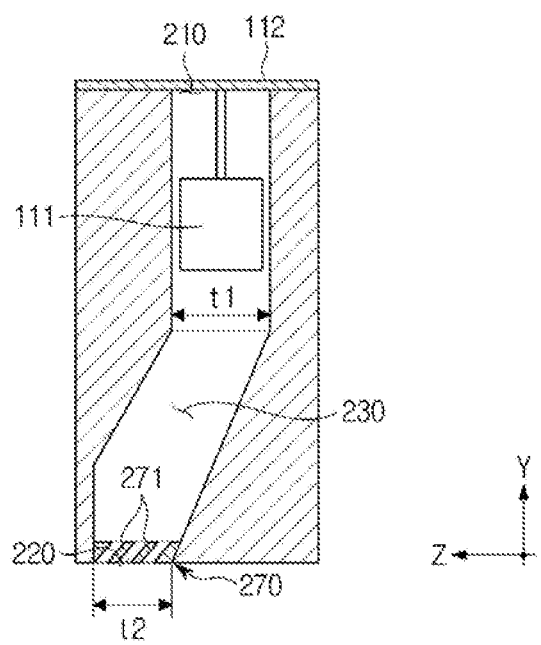
FIG. 11 is a cross-sectional view taken along an YZ axis of a guide of a display apparatus according to another embodiment of the present disclosure.

FIG. 11 is a cross-sectional view taken along an YZ axis of a guide of a display apparatus according to another embodiment of the present disclosure.

The guide 200 of the display apparatus 1 according to another embodiment of the present disclosure may include a guide portion 270 disposed on the second opening 220. The guide portion 270 may include a plurality of inclined surfaces 271 disposed to be inclined toward the front such that the ultrasonic waves emitted downward from the sensor head 111 may be reflected to the front by colliding with the plurality of inclined surfaces 271.

Accordingly, the ultrasonic waves passed through the second opening 220 formed between the plurality of inclined surfaces 271 may proceed to the front by the guide portion 270

The rear inner wall of the channel 230 may be provided in a planar form with respect to the YZ axis, but may also be provided in a curved form, like the rear inner wall of the channel 230 of an embodiment of the present disclosure.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
a display panel configured to display an image in a first direction;
a sensor disposed in a direction opposite to the first direction with respect to the display panel and comprising a sensor head configured to transmit ultrasonic waves in a second direction or receive the ultrasonic waves in a direction opposite to the second direction; and
a guide comprising
a first opening into which the sensor head is inserted,
a second opening opened in the second direction,
a channel connecting the first opening and the second opening, and a portion of the channel having a curved surface extending toward the second opening, and
a guide portion provided inside the channel to guide the ultrasonic waves to change a traveling direction of the ultrasonic waves passing through the channel.

2. The display apparatus according to claim 1, wherein the guide portion guides the ultrasonic waves to direct to the first direction when the ultrasonic waves transmitted from the sensor head pass through the second opening.

3. The display apparatus according to claim 1, wherein the guide portion guides the ultrasonic waves such that the ultrasonic waves received to the sensor head directs to a direction opposite to the second direction after passing through the second opening.

4. The display apparatus according to claim 1, further comprising
a top chassis disposed in the front of the display panel,
wherein the guide and the sensor are disposed at an inner side of the top chassis.

5. The display apparatus according to claim 1, further comprising
a top chassis disposed in the front of the display panel,
wherein the second opening of the guide is disposed on the same line as an edge of the top chassis in the first direction.

6. The display apparatus according to claim 1, wherein the guide portion is provided to be inclined in the first direction from the second direction.

7. The display apparatus according to claim 6, wherein the second opening is disposed to be spaced apart in the second direction with respect to the first opening,
the channel includes a first region adjacent to the first opening, a second region adjacent to the second opening, and a third region provided between the first region and the second region, and
the guide portion is disposed in the second region.

8. The display apparatus according to claim 7, wherein a cross-sectional area of the first region in the first direction is wider than a cross-sectional area of the third region in the first direction.

9. The display apparatus according to claim 7, wherein the guide further includes a partition provided in the third region to partition an inner space of the third region into a plurality of spaces in a third direction.

10. The display apparatus according to claim 7, wherein the guide further includes a partition provided in the third region to partition an inner space of the third region into a plurality of spaces in the first direction.

11. The display apparatus according to claim 1, wherein a width of the first opening is smaller than a width of the second opening.

12. The display apparatus according to claim 1, wherein a thickness of the second opening is ½ or less of a thickness of the first opening.

13. The display apparatus according to claim 1, wherein when a wavelength of an ultrasonic wave transmitted from the sensor header is A, a distance between an end portion of the sensor header and the second opening is a value of an integer multiple of $\lambda/2$.

14. The display apparatus according to claim 1, wherein the sensor further includes a sensor substrate on which the sensor head is mounted, and
the guide further includes a seating portion disposed on the first opening to allow the sensor substrate to be seated thereon.

15. The display apparatus according to claim 1, wherein the guide portion is disposed in the second opening.

16. A display apparatus comprising:
a display panel configured to display an image on the front;
a top chassis disposed in the front of the display panel;

a sensor disposed in the rear of the display panel to transmit ultrasonic waves in the up-down direction or to receive the ultrasonic waves in the up-down direction; and a guide including a channel having a curved surface, the guide configured to guide a direction of the ultrasonic waves to change a traveling direction of the ultrasonic waves transmitted from the sensor and the traveling direction of the ultrasonic waves received to the sensor, wherein the sensor and the guide are disposed inside the top chassis.

17. The display apparatus according to claim 16, wherein the sensor comprises a sensor head configured to transmit or receive the ultrasonic waves, the guide further comprises
a first opening into which the sensor head is inserted,
a second opening spaced apart in the up-down direction with respect to the first opening, wherein the channel connects the first opening and the second opening, and
a guide portion provided inside the channel to guide the ultrasonic waves to change the traveling direction of the ultrasonic waves, and the second opening is disposed on the same line as an edge of the top chassis in the front-rear direction.

18. The display apparatus according to claim 17, further comprising a bottom chassis coupled to the top chassis at the rear of the display panel and a rear cover covering the bottom chassis at the rear of the bottom chassis, wherein the sensor and the guide are disposed between the bottom chassis and the rear cover.

19. The display apparatus according to claim 17, wherein the guide portion is provided to be inclined forward such that the ultrasonic waves transmitted from the sensor head proceed forward.

20. A display apparatus comprising:

a display panel configured to display an image in a first direction;

a sensor disposed in a direction opposite to the first direction with respect to the display panel and configured to transmit ultrasonic waves in a second direction or receive the ultrasonic waves in a direction opposite to the second direction; and a guide including a channel having a curved surface, the guide configured to guide the ultrasonic waves such that a traveling direction of the ultrasonic waves transmitted in the second direction is changed in the first direction or to guide the ultrasonic waves such that the ultrasonic waves is received to the sensor by changing the traveling direction of the ultrasonic waves proceeding in the direction opposite to the first direction to the direction opposite to the second direction.

* * * * *